United States Patent [19]

Hüther

[11] Patent Number: 4,500,482
[45] Date of Patent: Feb. 19, 1985

[54] METHOD OF MANUFACTURE SILICON NITRIDE CERAMIC MOLDED ARTICLES

[75] Inventor: Werner Hüther, Karlsfeld, Fed. Rep. of Germany

[73] Assignee: Motoren-Und Turbinen-Union Munchen GmbH, Munich, Fed. Rep. of Germany

[21] Appl. No.: 129,452

[22] Filed: Mar. 11, 1980

[30] Foreign Application Priority Data

Mar. 20, 1979 [DE] Fed. Rep. of Germany ....... 2910943

[51] Int. Cl.$^3$ ............................................. C04B 35/64
[52] U.S. Cl. ...................................... 264/65; 264/325
[58] Field of Search ................... 264/65, 66, 332, 325; 106/73.5

[56] References Cited

U.S. PATENT DOCUMENTS

| | | | |
|---|---|---|---|
| 3,108,985 | 10/1963 | Weyer | 264/63 |
| 3,285,873 | 11/1966 | Bailey | 264/63 |
| 3,562,371 | 2/1971 | Bush | 264/65 |
| 3,631,139 | 12/1971 | Bauer | 264/63 |
| 4,125,592 | 11/1978 | Ezis et al. | 264/65 |
| 4,164,528 | 8/1979 | Yajima et al. | 264/65 |
| 4,177,230 | 12/1979 | Mazdiyasni | 264/65 |

OTHER PUBLICATIONS

Mazdiyasni, "Characterization of Organosilicon-Infiltrated Porous Reaction Sintered Si$_3$N$_4$", *J. Am. Ceram. Soc.*, vol. 61, No. 11-12, pp. 504-508, 1978.

*Primary Examiner*—John A. Parrish
*Attorney, Agent, or Firm*—Alan H. Levine

[57] ABSTRACT

A blank is molded from a powdery mixture of silicon, α-silicon nitride, and a sintering agent. The blank is nitrided to nitride the silicon content of the blank, and thereafter the blank is subjected to hot isostatic pressing. The silicon content of the original powdery mixture is between 5% and 60% by weight of the mixture, and the sintering agent, which may be an oxide, is present in the original powdery mixture in the range between 0.1% and 10% by weight. The nitriding is carried out in a nitrogen atmosphere at a temperature between 1100° C. and 1600° C. The nitriding may be carried out in two stages, first at a temperature between 1050° C. and 1400° C., and then at a temperature above the melting point of silicon.

6 Claims, No Drawings

METHOD OF MANUFACTURE SILICON NITRIDE CERAMIC MOLDED ARTICLES

This invention relates to a method of manufacturing silicon nitride ceramic molded articles wherein a blank is made using silicon powder, the silicon nitrided, and the blank then subjected to hot isostatic pressing.

An advantage afforded by this known method is that the ceramic molded articles can be produced in practically their final contour, if the linear shrinkage accompanying the hot isostatic pressing process is ignored. An important disadvantage encumbering this known method is the long total time required by the process and caused by the very lengthy nitriding process (100 to 300 hours). Another disadvantage is that the nitriding process also produces considerable contents of $\beta\text{-}Si_3N_4$, whereas a high $\alpha\text{-}Si_3N_4$ content would be desirable considering that during hot isostatic pressing the $\alpha$-phase can be reduced to the $\beta$-phase for improved strength properties. Another problem encountered with the known method concerns the deposition of sintering agents inside the porous $Si_3N_4$ component, which is generally achieved by dipping the component in suitable saline solutions and subsequent desiccation. During desiccation the concentrations within the $Si_3N_4$ component will fluctuate and this can cause distortion during the hot isostatic pressing process.

The majority of the problems accompanying the known process can seemingly be eliminated if in the manufacture of silicon nitride ceramic molded articles the starting material is silicon nitride powder, rather then silicon powder, and when this or the previously-mentioned method is used to produce a blank for subsequent hot isostatic pressing, an organic binding agent is used. The use of silicon nitride powder would seem to afford an advantage in that $\alpha\text{-}Si_3N_4$ could be used, the addition of sintering agents would be simple, i.e., in the form of suitable powders, and as a most essential benefit, the total process time could be considerably reduced because the need for reaction sintering is eliminated.

However, it has been shown that the use of silicon nitride powder is accompanied by another notable difficulty. When the blank is made of silicon nitride powder plus an organic binding agent, and when the binding agent is then removed from the blank by heat treatment, the resultant loosely coherent and extremely sensitive molded article is very difficult, if not impossible, to handle. However, the $Si_3N_4$ molded article will, after removal of the organic binding agent, inevitably require a certain amount of handling to permit encapsulation and hot isostatic pressing.

It is a broad object of the present invention to provide a method of the type described whereby the total time required for manufacturing a molded article of silicon nitride is minimized, and ease and safety of handling the blanks in the manufacturing process is ensured.

It is a particular object of the present invention to provide such a method using as a starting material a mixture of silicon powder, $\alpha$-silicon nitride powder, and a sintering agent.

The main advantage afforded by the process of the present invention is that the time required for nitriding, and thus the total time required for manufacturing a ceramic molded article, is substantially shorter than with the known method. The reason is that in the known method, the starting material is only silicon powder, all of which must be nitrided, whereas in the method of the present invention only the silicon portion must be nitrided, rather then the entire molded article. Additionally, the risk of the blank desintegrating when being handled for hot isostatic pressing is averted since the conversion of silicon to $Si_3N_4$ will cause the already-existing $\alpha\text{-}Si_3N_4$ to harden and produce a compact molded article. This blank is sufficiently stable for encapsulation and subsequent hot isostatic pressing.

Further advantages afforded by the method of present invention are that the $\alpha\text{-}Si_3N_4$ content, compared with that of ceramic molded articles produced by conventional reaction sintering methods, is notably high. In addition, the invention facilities the incorporation of the sintering agent.

In a preferred embodiment of the present invention, the silicon content of the starting powdery mixture material runs from 5% to 60% by weight. As sintering agents, use is preferably made of oxides, such as MgO, $Al_2O_3$, $Y_2O_3$, $Cr_2O_3$, $Fe_2O_3$ and FeO, known from the ram injection type of hot pressing, and in the proportions (0.1% to 10% by weight of the starting mixture) used in that technique. The blank is preferably nitrided in a nitrogen atmosphere at 1100° to 1600° C. A special benefit is obtained when nitriding takes place at a temperature above the melting temperature of the silicon, a practice which will shorten the time required for nitriding. With the method of the present invention, nitriding at such a temperature is made possible by the fact that the blank, because of its starting $Si_3N_4$ content, will retain its shape even should the silicon content melt.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:
1. A method of manufacturing silicon nitride ceramic molded articles comprising the steps of:
    (a) providing a powdery mixture of silicon, $\alpha$-silicon nitride, and a sintering agent,
    (b) molding a blank from the powdery mixture,
    (c) nitriding the silicon content of the blank, and
    (d) thereafter subjecting the blank to hot isostatic pressing.
2. A method as defined in claim 1 wherein the silicon content of the powdery mixture is in the range of 5% to 60% by weight of the powdery mixture.
3. A method as defined in claim 1 wherein the sintering agent is an oxide present in the powdery mixture in range of 0.1% to 10% by weight of the powdery mixture.
4. A method as defined in claim 3 wherein the sintering agent is selected from the group consisting of MgO, $Al_2O_3$, $Y_2O_3$, $Cr_2O_3$, $Fe_2O_3$, and FeO. .
5. A method as defined in claim 1 wherein the blank is nitrided in a nitrogen atmosphere at a temperature between 1100° C. and 1600° C.
6. A method as defined in claim 1 wherein the blank is nitrided at a relatively low temperature in the range between 1050° C. and 1400° C. during a first phase, and then at a temperature above the melting point of silicon during a second phase.

* * * * *